United States Patent
Sinzig et al.

(10) Patent No.: US 10,005,199 B2
(45) Date of Patent: Jun. 26, 2018

(54) CUT-LENGTH INDICATING DEVICE

(71) Applicant: Robert Bosch GmbH, Stuttgart (DE)

(72) Inventors: Bruno Sinzig, Oberbipp (CH); Sergio Miracco, Gerlafingen SO (CH); Christian Bermes, Rapperswil (CH)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 14/954,771

(22) Filed: Nov. 30, 2015

(65) Prior Publication Data
US 2016/0151930 A1   Jun. 2, 2016

(30) Foreign Application Priority Data
Dec. 2, 2014   (DE) .................. 10 2014 224 571

(51) Int. Cl.
*B27B 9/02* (2006.01)
*B23D 59/00* (2006.01)

(52) U.S. Cl.
CPC ............. *B27B 9/02* (2013.01); *B23D 59/002* (2013.01)

(58) Field of Classification Search
CPC ............ B27B 9/02; B23D 59/002; G01B 5/02
See application file for complete search history.

(56) References Cited

U.S. PATENT DOCUMENTS

| | | | | |
|---|---|---|---|---|
| 5,675,899 A * | 10/1997 | Webb | ................... | B23D 59/003 30/390 |
| 5,996,460 A * | 12/1999 | Waite | .................... | B23D 33/12 30/123 |
| 6,481,322 B1 * | 11/2002 | Hsiung | ................ | B23D 59/003 362/89 |
| 6,755,107 B2 * | 6/2004 | Peot | ..................... | B23D 59/002 83/478 |
| 9,623,583 B2 * | 4/2017 | Sinzig | ..................... | B27B 21/08 |
| 2006/0213347 A1 * | 9/2006 | Jan | ........................ | B23D 59/003 83/520 |
| 2006/0277768 A1 * | 12/2006 | van Rijen | ............ | B23D 59/003 30/388 |
| 2013/0247737 A1 * | 9/2013 | Chen | .................... | B23D 59/003 83/471.3 |
| 2014/0290458 A1 * | 10/2014 | Sinzig | .................. | B25H 1/0078 83/477.2 |
| 2015/0000142 A1 * | 1/2015 | Bermes | ..................... | B27B 9/02 30/293 |

(Continued)

FOREIGN PATENT DOCUMENTS

| DE | 10 2008 046 705 A1 | 3/2010 |
|---|---|---|
| DE | 10 2012 219 397 A1 | 1/2014 |

*Primary Examiner* — Hwei C Payer
(74) *Attorney, Agent, or Firm* — Maginot, Moore & Beck LLP

(57) ABSTRACT

A cut-length indicating device for a portable power tool comprises at least one indicating unit including at least one movably mounted indicating element configured to indicate at least one position of a cut edge of a machining tool in dependence on a set cut depth of the machining tool, and at least one position setting unit configured to move the indicating element into a position that is dependent on a cut-depth setting of the machining tool. The cut-length indicating device further comprises at least one adjusting unit configured to adapt at least one maximum setting movement distance of the indicating element to at least one machining-tool parameter of the machining tool.

15 Claims, 6 Drawing Sheets

(56) References Cited

U.S. PATENT DOCUMENTS

2015/0165637 A1\* 6/2015 Sinzig ................. B23D 59/002
  30/505
2016/0151930 A1\* 6/2016 Sinzig ................. B23D 59/002
  30/505

\* cited by examiner

CUT-LENGTH INDICATING DEVICE

This application claims priority under 35 U.S.C. § 119 to patent application no. DE 10 2014 224 571.0, filed on Dec. 2, 2014 in Germany, the disclosure of which is incorporated herein by reference in its entirety.

BACKGROUND

A cut-length indicating device for a portable power tool is already known from DE 10 2012 219 397 A1. The cut-length indicating device in this case comprises at least one indicating unit, which comprises at least one movably mounted indicating element for indicating at least one position of a cut edge of a machining tool in dependence on a set cut depth of the machining tool, and at least one position setting unit for moving the indicating element into a position that is dependent on a cut-depth setting of the machining tool.

SUMMARY

The disclosure is based on a cut-length indicating device for a portable power tool, having at least one indicating unit, which comprises at least one movably mounted indicating element for indicating at least one position of a cut edge of a machining tool in dependence on a set cut depth of the machining tool, and having at least one position setting unit for moving the indicating element into a position that is dependent on a cut-depth setting of the machining tool.

It is proposed that the cut-length indicating device comprise at least one adjusting unit, which is provided at least to adapt at least one maximum setting movement distance of the indicating element to at least one machining-tool parameter of the machining tool. The term "adjusting unit" in this case is intended, in particular, to define a unit that is provided to render possible, in addition to one possibility for setting an element, in particular in addition to one possibility for setting a position of the indicating element in dependence on a set cut depth of the machining tool, a further possibility for setting the element for the purpose of adapting the possibility for setting the element to differing setting influencing factors, in particular a further possibility for setting the indicating element for the purpose of adapting the possibility for setting a position of the indicating element in dependence on a set cut depth of the machining tool to differing setting influencing factors, such as, for example, adaptation to machining-tool parameters that can be changed by removal of material and/or reworking (diameter, length, cutting-edge protrusion, cutting-edge dimension, or the like), to differing machining-tool types having differing dimensions, or the like. The adjusting unit may be realized as a mechanical or as an electronic adjusting unit. The adjusting unit may be realized as a unit that can be operated manually, or as a motor-assisted unit. "Provided" is to be understood to mean, in particular, specially designed and/or specially equipped. That an element and/or a unit is provided for a particular function, is to be understood to mean, in particular, that the element and/or the unit fulfill/fulfills and/or execute/executes this particular function in at least one application state and/or operating state.

Preferably, the adaptation of a maximum setting movement distance of the indicating element to at least one machining-tool parameter of the machining tool is at least substantially different from, or additional to, a pure position setting movement of the indicating element for the purpose of setting a position of the indicating element in dependence on a set cut depth of the machining tool by means of a cut-depth setting unit of the portable power tool. A "setting movement distance of the indicating element" is to be understood here to mean, in particular, a distance traveled by at least one point of the indicating element that is disposed on and/or at the indicating element, during a movement of the indicating element along and/or about a movement axis of the indicating element.

Preferably, the indicating element is movably mounted, at least in a movement plane of the indicating element that is at least substantially parallel to a cutting plane of the machining tool. "Substantially parallel" is to be understood here to mean, in particular, an alignment of a direction relative to a reference direction, in particular in one plane, the direction deviating from the reference direction by, in particular, less than 8°, advantageously less than 5°, and particularly advantageously less than 2°. Cutting edges of cutting teeth of the machining tool are preferably at least substantially transverse to the cutting plane of the machining tool. The machining tool is preferably realized as a circular saw blade. Preferably, the machining tool can be driven in rotation on the portable power tool, in particular can be disposed on a tool receiver of the portable power tool, for the purpose of making a cut in the workpiece, in the cutting plane of the machining tool. The cutting plane, for the purpose of making a cut in the workpiece, is preferably at least substantially transverse to a workpiece surface of a workpiece to be machined and/or at least substantially transverse to a workpiece support face of a support unit of the portable power tool. "At least substantially transverse" is to be understood here to mean, in particular, an alignment of a plane and/or of a direction relative to a further plane and/or a further direction that is preferably other than a parallel alignment of the plane and/or of the direction relative to the further plane and/or the further direction. The indicating element is preferably mounted in a translationally and/or rotationally movable manner in the movement plane of the indicating element. Preferably, the indicating element is movably mounted on a straight or curved path.

The indicating element is preferably realized as an emitting indicating element, which is provided to emit a light beam, in particular a laser beam, to indicate a cut edge on a workpiece. Preferably, for the purpose of indicating a cut edge of the machining tool, a light beam emitted by the indicating element, in particular a laser beam emitted by the indicating element, is at least partially at least substantially parallel to the movement plane of the indicating element. The light beam emitted by the indicating element, in particular the laser beam emitted by the indicating element, forms a cut-edge indicating line of the indicating element. Particularly preferably, for the purpose of forming the cut-edge indicating line, the light beam emitted by the indicating element, in particular the laser beam emitted by the indicating element, is at least largely at least substantially parallel to the movement plane of the indicating element. Preferably, the cut-edge indicating line is realized as a punctiform image of a laser beam on a workpiece. It is also conceivable, however, for the cut-edge indicting line to be deflectable and realized as a linear image on a workpiece. The cut-edge indicating line preferably indicates at least an emergence point or entry point of the machining tool, in particular of cutting edges of the machining tool, from or into a workpiece to be machined, on a workpiece surface of the workpiece, at which cutting edges of the machining tool would emerge from the workpiece or enter the workpiece, in machining of the workpiece, as a result of a set cut depth of the machining tool having been attained, in particular dissociated from a traversing movement of the portable power tool, on the workpiece surface of the workpiece. The indicating element forms the cut-edge indicating line, preferably at least partially, at least substantially transversely, in particular at least substantially perpendicularly, in relation to the cutting plane of the machining tool on the workpiece.

Advantageously, the indicating unit has at least one further movably mounted indicating element, which, in at least one operating state, for the purpose of indicating at least one position of a further cut edge of the machining tool, has a further cut-edge indicating line that is at least substantially transverse to a movement plane of the further indicating element. Particularly preferably, the further indicating element, in at least one operating state, for the purpose of indicating the position of the further cut edge, has a further cut-edge indicating line, which is at least substantially transverse to a movement plane of the indicating element and/or at least substantially transverse to a cutting plane of the machining tool. Preferably, the further indicating element images on the workpiece a further cut-edge indicating line, corresponding to an entry point of the machining tool, on the workpiece. The indicating element preferably images a cut-edge indicating line corresponding to an emergence point of the machining tool.

Particularly preferably, the position setting unit comprises at least one movement coupling element, which connects the indicating element and the further indicating element of the indicating unit to each other in a movement-dependent manner. "Connect in a movement-dependent manner" is to be understood here to mean, in particular, a connection of at least two elements by means of a mechanism, such as, for example, by means of a gearing or by means of a direct connection, by which the two elements are moved jointly, in particular at least substantially simultaneously. The position setting unit may have a movement coupling element realized as toothed-rack coupling element, as a bar coupling element, as a toothed-wheel coupling element, or the like, which connects the indicating element and the further indicating element to each other in a movement-dependent manner.

Preferably, the position setting unit comprises at least the movement coupling element, which is connected to a guide element of the position setting unit on which the indicating element is disposed. A "guide element" is to be understood here to mean, in particular, an element that acts in combination with at least one further element in order to guide a component in a movement along a defined path, by means of action of at least one constraining force transverse to a direction of movement. A "constraining force" is to be understood here to mean, in particular, a force provided to prevent a component from moving in at least one direction, and/or to keep the component on a path, defined by means of action of the force upon the component, during a movement. The guide element is preferably mounted in a pivotable or rotatable manner on the movement coupling element.

Preferably, the guide element is guided, by an end that faces away from the movement coupling element, on at least one constraint guide element or in at least one guide recess of the position setting unit. The expression "guide recess" is intended here to define, in particular, a recess provided to guide a component, in a movement along a defined path, by means of action of at least one constraining force transverse to a direction of movement. Particularly preferably, the guide element engages in the guide recess. In a movement of the indicating element along a defined path, the indicating element is thus preferably guided by means of a combined action of the guide element and the constraint guide element or the guide recess of the position setting unit. It is also conceivable, however, in a movement of the indicating element along a defined path, for the indicating element to be guided by means of a combined action of the guide element and a guide rib of the position setting unit.

Particularly advantageously, the indicating unit is realized as a laser indicating unit. The indicating element and the further indicating element are thus preferably each realized as a laser indicating element. The indicating element and the further indicating element are preferably realized as laser diodes. Preferably, the indicating element and the further indicating element, in at least one operating state, project the cut-edge indicating line and the further cut-edge indicating line on to the workpiece to be machined. Particularly preferably, therefore, the indicating element, in at least one operating state, for the purpose of indicating the position of the further cut edge, images on a workpiece to be machined a cut-edge indicating line that is at least substantially transverse to a movement plane of the indicating element and/or at least substantially transverse to a cutting plane of the machining tool. In addition, particularly preferably, the further indicating element, in at least one operating state, for the purpose of indicating the position of the further cut edge, images on a workpiece to be machined a further cut-edge indicating line that is at least substantially transverse to a movement plane of the indicating element and/or at least substantially transverse to a cutting plane of the machining tool.

Advantageously, the design of the cut-length indicating device according to the disclosure enables a possibility for setting a position of the indicating element in dependence on a set cut depth of the machining tool to be adapted to differing influencing factors, such as, for example, adaptation to machining-tool parameters that can be changed by removal of material or reworking (diameter, length, cutting-edge protrusion, or the like), to differing machining-tool types having differing dimensions, or the like. Advantageously, therefore, it is possible for the cut-length indicating device to be adapted to a great variety of machining tools, to worn or re-ground machining tools or the like. Advantageously, with use of the cut-length indicating device, particularly precise machining of a workpiece can be achieved.

Furthermore, it is proposed that the adjusting unit be provided to adapt the at least one maximum setting movement distance of the indicating element to at least one machining-tool diameter of the machining tool, in particular to a machining-tool diameter of the machining tool changed as a result of removal of material and/or reworking. Preferably, a machining-tool diameter of the machining tool changed as a result of removal of material and/or reworking is less than a machining-tool diameter of the machining tool when the machining tool is in a delivery state. Moreover, advantageously, the adjusting unit enables the at least one maximum setting movement path of the indicating element to be adapted to differing machining-tool diameters of differing machining tools. Advantageously, the design according to the disclosure makes it possible to achieve a high degree of variability in respect of a field of application of the cut-length indicating device. Advantageously, therefore, the cut-length indicating device can preferably be rendered usable for a great variety of machining tools and/or for worn and/or reworked machining tools. Advantageously, it is possible to maintain precise machining of workpieces with differing machining tools and/or with worn and/or reworked machining tools.

Further, it is proposed that the adjusting unit, for the purpose of adapting the at least one maximum setting movement distance of the indicating element, be provided, at least, to set at least one maximum distance between two connection regions of at least one guide element of the position setting unit on which the indicating element is movably mounted.

A "connection region" is to be understood here to mean, in particular, a region of at least one element that is provided to connect the element to at least one further element, in particular for the purpose of receiving the further element or mounting the further element on the element. The guide element may be of a multipart design, with sub-regions of the guide element being movably mounted on one another, or the guide element may be designed for repeated, non-destructive elastic deformation, such as, for example, designed as a spring-steel guide element or the like. Preferably, for the purpose of adapting the at least one maximum setting movement distance of the indicating element, the connection regions of the guide element can be moved relative to each other by means of the adjusting unit. The design according to the disclosure enables an adaptation of the at least one maximum setting movement distance of the indicating element to be realized, by means of the adjusting unit, in a structurally simple manner.

It is additionally proposed that the adjusting unit comprise at least one self-inhibiting unit, which is provided to prevent, at least insofar as possible, an inadvertent adjustment of the at least one maximum setting movement distance of the indicating element. The expression "self-inhibiting unit" is intended here to define, in particular, a unit provided to generate a resistance, caused by friction and/or positive engagement, against an unwanted relative movement of two elements that are connected to each other, in particular of the connection regions of the guide element, in particular in order to avoid an unwanted relative movement of the two elements after a wanted setting movement. The self-inhibiting unit may be realized as a screwed-connection inhibiting unit, as a gear inhibiting unit, as a motion-transmitting screw-thread inhibiting unit, as a wedge inhibiting unit, as a ball inhibiting unit, or as another self-inhibiting unit considered appropriate by persons skilled in the art. The design according to the disclosure makes it possible, advantageously, to achieve a reliable safeguard against an unwanted self-adjustment of an adjusted maximum setting movement distance of the indicating element. It can thus be ensured, advantageously, that precise machining of a workpiece can be achieved, in particular following an adjustment of a maximum setting movement distance of the indicating element.

Furthermore, it is proposed that the adjusting unit comprise at least one resetting element, which is provided to enable and/or assist an at least partially automatic resetting of the at least one adaptable maximum setting movement distance of the indicating element to an initial adjustment state. Preferably, the resetting element is realized as a spring element. It is also conceivable, however, for the resetting element to be of a different design, considered appropriate by persons skilled in the art, such as, for example, designed as a hydraulic cylinder element, as a pneumatic cylinder element, as a piezoelectric element, as a smart-materials element, or the like. It is additionally conceivable for the resetting element to be integral with the guide element, in particular if the guide element is made of a repeatedly elastically deformable material such as, for example, spring steel or the like. "Integral with" is to be understood to mean, in particular, connected at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank. Particularly advantageously, the design according to the disclosure makes it possible to achieve convenient operation of the cut-length indicating device.

Further, it is proposed that the adjusting unit have at least one operating element for adapting the at least one maximum setting movement distance of the indicating element to at least one machining-tool parameter of the machining tool. An "operating element" is to be understood to mean, in particular, an element provided to receive an input quantity from an operator during an operating procedure and, in particular, to be contacted directly by an operator, a touch on the operating element being sensed, and/or an actuating force exerted upon the operating element being sensed and/or transmitted mechanically for the purpose of actuating a unit and/or a further unit. The operating element may be realized as a mechanical or as an electronic operating element. Advantageously, convenient adjustment can be achieved.

It is additionally proposed that the adjusting unit have at least one adjusting-tool receiving interface for adapting the at least one maximum setting movement distance of the indicating element to at least one machining-tool parameter of the machining tool, it being possible for an adjusting tool to be detachably disposed on the adjusting-tool receiving interface. The adjusting-tool receiving interface may be provided as an alternative or in addition to the operating element. Preferably, the adjusting-tool receiving interface is disposed on the operating element, in particular is integral with the operating element. The adjusting tool may be realized as a screwdriver, as an internal-hexagon key, as an open-end wrench, as a torx key, or the like. The adjusting-tool receiving interface is preferably realized to correspond to the adjusting tool. The adjusting-tool receiving interface may be realized as a cross-recess receiver, as a slotted receiver, as an internal hexagon, as an external hexagon, as a torx receiver, or the like. Advantageously, the design according to the disclosure makes it possible to achieve a reliable application of force for an adjustment.

Furthermore, it is proposed that the cut-length indicating device comprise at least one output unit, which is provided to output at least one setting parameter of the adjusting unit. The output unit may be of an analog or digital design. The output unit may be realized as an optical, acoustic and/or haptic output unit. Preferably, the output unit comprises at least one analog scale for outputting an adjustment parameter of the adjusting unit. The setting parameter may be dependent on the machining-tool parameter, the maximum setting movement distance, or other parameters considered appropriate by persons skilled in the art. Alternatively or additionally, the output unit has at least one display for outputting at least one adjustment parameter of the adjusting unit. It is also conceivable, however, for the indicating unit to have only illumination elements such as, for example, LEDs or the like, for outputting at least one adjustment parameter of the adjusting unit. Thus, advantageously, an adjustment parameter can be output to an operator, to enable an adjustment to be monitored or checked in a convenient manner.

Also proposed is a portable power tool, in particular a circular saw, having at least one cut-depth setting unit for setting a cut depth of a machining tool, and having at least one cut-length indicating device according to the disclosure. A "portable power tool" is to be understood here to mean, in particular, a power tool, in particular a hand-held power tool, that can be transported by an operator without the use of a transport machine. The portable power tool has, in particular, a mass of less than 40 kg, preferably less than 10 kg, and particularly preferably less than 5 kg. Particularly preferably, the portable power tool is realized as a plunge-cut circular saw. It is also conceivable, however, for the power tool to be of a different design, considered appropriate by persons skilled in the art. The cut-depth setting unit is preferably provided to set a cut depth of the machining tool that can be coupled to a tool receiver of the portable power tool. The expression "cut-depth setting unit" is intended here to define, in particular, a unit provided to limit an insertion distance of the machining tool, in particular a circular saw blade, connected to the tool receiver of the portable power tool, into a workpiece to be machined, and/or to set a length of an insertion distance of the machining tool into the workpiece to be machined. In this case, the insertion distance of the machining tool into the workpiece to be machined is as viewed, in particular, along a distance that is at least substantially perpendicular to a support face of a support unit of the portable power tool, by which the portable power tool is supported on a workpiece surface of a workpiece to be machined. The expression "substantially perpendicular" is intended here to define, in particular, an alignment of a direction relative to a reference direction, the direction and the reference direction, in particular as viewed in one plane, enclosing an angle of 90° and the angle having a maximum deviation of, in particular, less than 8°, advantageously less than 5°, and particularly advantageously less than 2°.

Preferably, the position setting unit is provided to move at least the indicating element in dependence on a movement of a cut-depth setting element of the cut-depth setting unit. The cut-depth setting element is realized, particularly preferably, as a depth stop, which limits an insertion distance of the machining tool, in particular a circular saw blade, connected to the tool receiver of the portable power tool, into a workpiece to be machined, and/or by means of which a length of the insertion distance can be set. Preferably, the cut-depth setting unit comprises at least one movably mounted cut-depth setting element, which is connected to a movement coupling element of a position setting unit of the cut-length indicating device. In this case, the movement coupling element preferably taps a movement of the cut-depth setting element, and transmits the movement to the indicating element, in particular via a guide element of the position setting unit. A movement dependence between the cut-depth setting element and the indicating element can thus be realized in a structurally simple manner. The portable power tool designed according to the disclosure makes it possible, advantageously, to achieve precise machining of a workpiece by means of the portable power tool.

It is additionally proposed that the portable power tool comprise at least one housing unit, on which at least the adjusting unit of the cut-length indicating device is disposed such that it can be operated from the outside. The housing unit preferably comprises at least one outwardly open housing opening, in which at least the operating element and/or the adjusting-tool receiving interface is disposed. Preferably, the housing opening is disposed on a side of the housing unit that faces away from a drive-unit receiving interface of the housing unit. The design according to the disclosure is such that, advantageously, the cut-length indicating device is easy to operate. Moreover, the cut-length indicating device can be disposed in the housing unit in a structurally simple manner and, advantageously, operation can conveniently be effected from the outside.

The cut-length indicating device according to the disclosure and/or the portable power tool according to the disclosure are/is not intended in this case to be limited to the application and embodiment described above. In particular, the cut-length indicating device according to the disclosure and/or the portable power tool according to the disclosure may have individual elements, components and units that differ in number from a number stated herein, in order to fulfill a principle of function described herein.

Moreover, in the case of the value ranges specified in this disclosure, values that are within the stated limits are to be deemed as disclosed and applicable in any manner.

BRIEF DESCRIPTION OF THE DRAWING

Further advantages are disclosed by the following description of the drawing. The drawing shows an exemplary embodiment of the disclosure. The drawing, the description and the claims contain numerous features in combination. Persons skilled in the art will also expediently consider the features individually and combine them to create appropriate further combinations.

There are shown in.

DETAILED DESCRIPTION

Figure 1:
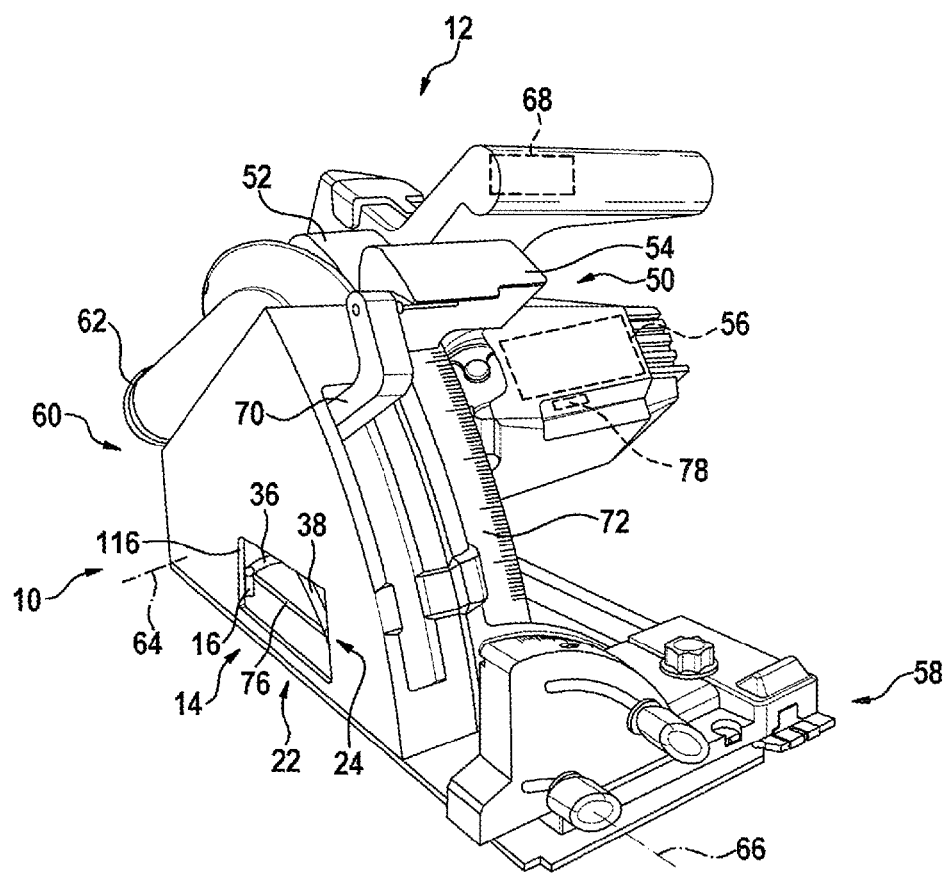
FIG. 1 a portable power tool according to the disclosure, having at least one cut-depth setting unit for setting a maximum cut depth of a machining tool, and having at least one cut-length indicating device according to the disclosure, in a schematic representation, FIG. 2 a diagram of the cut-length indicating device according to the disclosure, in a schematic representation, FIG. 3 a detail view of an adjusting unit of the cut-length indicating device according to the disclosure, partially disposed on a guide element of a position setting unit of the cut-length indicating device according to the disclosure, in a schematic representation, FIG. 4 an exploded representation of the adjusting unit partially disposed on the guide element of the position setting unit, in a schematic representation, FIG. 5 a detail view of a self-inhibiting unit of the adjusting unit, in a schematic representation, and FIG. 6 an exploded representation of the adjusting unit partially disposed on a further guide element of the position setting unit, in a schematic representation.

FIG. 1 shows a portable power tool 12, which comprises at least one cut-depth setting unit 50 for setting a maximum cut depth of a machining tool 20 (FIG. 2), and at least one cut-length indicating device 10. The portable power tool 12 is realized as a circular saw, in particular as a plunge-cut circular saw. A setting of a position of a cut-depth setting element 54 of the cut-depth setting unit 50 can be used, in a manner already known to persons skilled in the art, to set a cut depth of the machining tool 20. The machining tool 20 can be connected to a tool receiver (not represented in greater detail here) of the portable power tool 12, in a manner already known to persons skilled in the art. The portable power tool 12 additionally comprises a housing unit 52, which is provided to enclosed and/or to mount a drive unit 56 of the portable power tool 12. The drive unit 56 comprises a drive shaft (not represented in greater detail here), which is provided to drive the machining tool 20 that can be coupled to the tool receiver, in a manner already known to persons skilled in the art. The portable power tool 12 in this case may have a transmission unit for torque conversion, or the portable power tool 12 may be realized without a transmission.

Furthermore, the portable power tool 12 comprises a support unit 58, realized as a base plate or slide shoe, by means of which the portable power tool 12, when machining a workpiece (not represented in greater detail here), is supported on a surface of the workpiece or on a surface of a power-tool guide device (not represented in greater detail here) realized as a guide rail, or glides on the surface of the workpiece, or on the surface of the power-tool guide device realized as a guide rail, when moving to make a cut in the workpiece. The support unit 58 can be coupled to the power-tool guide device realized as a guide rail, in a manner already known to persons skilled in the art. Additionally disposed on the support unit 58 is a protective unit 60 of the portable power tool 12, which protects an operator against injury when machining the workpiece.

The protective unit 60 in this case is realized as a protective hood, which encloses the machining tool 20, when in a mounted state, by more than 160° along a direction of rotation of the drive shaft. The protective unit 60 additionally has a suction-extraction coupling element 62, which can be connected to a suction extraction unit (not represented in greater detail here) for extracting removed workpiece particles by suction as the workpiece is being machined. The housing unit 52 is mounted on the protective unit 60 so as to be pivotable relative to the support unit 58. In this case, the housing unit 52 is mounted on the protective unit 60 so as to be pivotable about a plunge pivot axis 64, relative to the support unit 58, in a manner already known to persons skilled in the art. Further, the housing unit 52, together with the protective unit 60, is mounted on the support unit 58 so as to be pivotable about a tilt pivot axis 66, relative to the support unit 58, in a manner already known to persons skilled in the art. The plunge pivot axis 64 extends at least substantially perpendicularly in relation to the tilt pivot axis 66. In addition, the cut-depth setting unit 50 is disposed on a side of the protective unit 60 that faces toward the housing unit 52.

The cut-length indicating device 10 for the portable power tool 12 comprises at least one indicating unit 14, which has at least one movably mounted indicating element 16 (FIG. 2) for indicating at least one position of a cut edge of the machining tool 20 in dependence on a set cut depth of the machining tool 20, in particular in dependence on a cut depth of the machining tool 20 set by means of the cut-depth setting unit 50. Further, the cut-length indicating device 10 comprises at least one position setting unit 22 for moving the indicating element 16 into a position that is dependent on a cut depth setting of the machining tool 20. The cut depth of the machining tool 20 can be set by means of the cut-depth setting unit 50. The indicating element 16 has a cut-edge indicating line that is at least substantially transverse to a movement plane of the indicating element 16, for indicating the position of the cut edge, in at least one operating state. Further, the indicating unit 14 has at least one further movably mounted indicating element 18 that has a further cut-edge indicating line that is at least substantially transverse to a movement plane of the further indicating element 18, for indicating at least one position of a further cut edge of the machining tool 20, in at least one operating state. The indicating unit 14 is realized as a laser indicating unit. The indicating element 16 and the further indicating element 18 are thus realized as laser indicating elements. For the purpose of indicating the position of the cut edge, in at least one operating state, the indicating element 16 images on the workpiece to be machined the cut-edge indicating line that is at least substantially transverse to a movement plane of the indicating element 16 and/or at least substantially transverse to a cut plane of the machining tool 20. The cut-edge indicating line of the indicating element 16 in this case is formed by a laser line. For the purpose of indicating the position of the cut edge, in at least one operating state, the further indicating element 18 images on the workpiece to be machined the further cut-edge indicating line that is at least substantially transverse to a movement plane of the further indicating element 18 and/or at least substantially transverse to the cut plane of the machining tool 20. The cut-edge indicating line of the further indicating element 18 is likewise formed by a laser line. In a design of the indicating unit 14 that is not represented in greater detail here, the cut-edge indicating line of the indicating element 16 and the cut-edge indicating line of the further indicating element 18 are each formed by a laser point, or by a transverse extent of a laser beam, the laser beam being at least substantially parallel to the movement plane of the indicating element 16, or of the further indicating element 18. For the purpose of generating laser beams, the indicating element 16 and the further indicating element 18 can be supplied with energy by an energy unit 68 of the cut-length indicating device 10 and/or of the portable power tool 12. The energy unit 68 may be constituted by a separate battery pack, or the energy unit 68 is electrically connected to an energy supply unit (not represented in greater detail here) of the portable power tool 12.

The cut-edge indicating line imaged on the workpiece by the indicating element 16 is provided to indicate, on the workpiece to be machined, a position of a front cut edge of the machining tool 20, as viewed along a direction that is contrary to a direction of movement of the portable power tool 12 for making a cut in the workpiece. The front cut edge of the machining tool 20 corresponds to a front emergence edge of cutting edges of the machining tool 20 from the workpiece to be machined when a maximum cut depth of the machining tool 20, set by means of the cut-depth setting unit 50, has been attained. The further cut-edge indicating line is provided to indicate a position of a rear cut edge of the machining tool 20 on the workpiece to be machined, as viewed along the direction contrary to the direction of movement of the portable power tool 12 for making a cut in the workpiece. The rear cut edge of the machining tool 20 corresponds to a rear entry edge of cutting edges of the machining tool 20 into the workpiece to be machined when a maximum cut depth of the machining tool 20, set by means of the cut-depth setting unit 50, has been attained.

Figure 2:
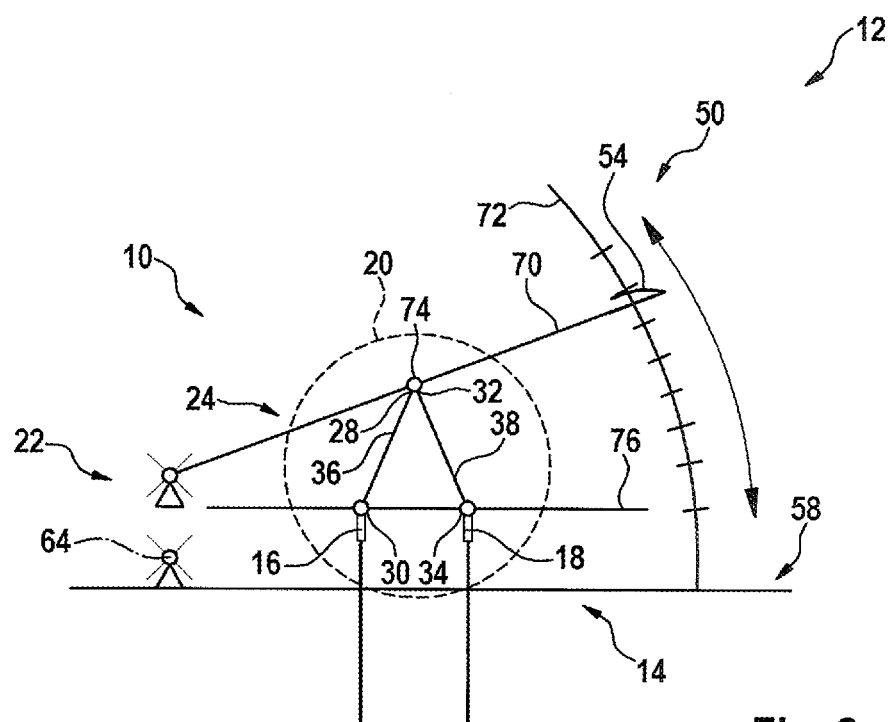

Furthermore, the cut-length indicating device 10 comprises at least the position setting unit 22, which connects the indicating element 16 and the further indicating element 18 of the indicating unit 14 to each other in a movement-dependent manner (FIG. 2). The position setting unit 22 has at least one movement coupling element 70, which is connected in an articulated manner to the guide element 36 of the position setting unit 22, on which the indicating element 16 is disposed. Further, the position setting unit 22 has at least one further guide element 38, which is connected in an articulated manner to the movement coupling element 70 and on which the further indicating element 18 is disposed. The movement coupling element 70 is realized as a movement coupling bar. It is also conceivable, however, for the movement coupling element 70 to be of a different design, considered appropriate by persons skilled in the art, such as, for example, designed as a toothed wheel, as a toothed bar, as a cam mechanism element, etc. The movement coupling element 70 is pivotally mounted, by one end, on the support unit 58 and/or on the protective unit 60 and/or on the housing unit 52. The pivot axis of the movement coupling element 70 is coaxial with the plunge pivot axis 64 of the housing unit 52. The movement coupling element 70 is connected, by a further end of the movement coupling element 70, to the cut-depth setting element 54 of the cut-depth setting unit 50. The cut-depth setting element 54 is movably mounted on a guide path element 72 of the cut-depth setting unit 50, for the purpose of setting a cut depth of the machining tool 20. The cut-depth setting unit 50 comprises at least the movably mounted cut-depth setting element 54, which is connected to the movement coupling element 70 of the position setting unit 22 of the cut-length indicating device 10. The guide path element 72 is disposed on a side of the protective unit 60 that faces toward the housing unit 52. Upon a movement of the cut-depth setting element 54 relative to the guide path element 72, the movement coupling element 70 is likewise moved relative to the guide path element 72, along a course of the guide path element 72, because of the connection to the cut-depth setting element 54.

The guide element 36 and the further guide element 38 are connected in an articulated manner to the movement coupling element 70 by means of a bearing pin element 74 of the position setting unit 22 (FIG. 2). In addition, the guide element 36 is guided, by an end that faces away from the movement coupling element 70, on at least one constraint guide element 76 of the position setting unit 22. The further guide element 38 is likewise guided, by an end that faces away from the movement coupling element 70, on the constraint guide element 76 of the position setting unit 22. The constraint guide element 76 is realized as a guide bar, on which the guide element 36 and the further guide element 38 are guided, in particular by means of the indicating element 16 and the further indicating element 18. It is also conceivable, however, for the guide element 36 and the further guide element 38 to engage, respectively, in a guide recess of the position setting unit 22 and to be guided thereby. The guide recess/recesses in this case may be straight or curved. The guide element 36 and the further guide element 38 are guided by means of the constraint guide element 76 in such a manner that the indicating element 16 and the further indicating element 18 are moved relative to each other by means of the movement coupling element 70, in dependence on a movement of the cut-depth setting element 54, in order to form cut-edge indicating lines, which are aligned exactly to an emergence and entry cut edge of the machining tool 20 that are produced by the machining tool 20 after the cut-depth setting element 54 comes to a stop in a plunge position in the workpiece, in particular dissociated from a pure travel movement of the portable power tool 12 on the workpiece, and/or which indicate the points between which the machining tool 20, for the purpose of making a cut in the workpiece, projects out of the protective unit 60 and/or over the support unit 58 after the cut-depth setting element 54 comes to a stop in the plunge position.

Setting of a desired maximum cut depth of the machining tool 20 by means of the cut-depth setting unit 50 results in the indicating element 16 and the further indicating element 18 being moved relative to each other, in particular moved jointly relative to each other. The movement coupling element 70 taps a movement of the cut-depth setting element 54 relative to the guide path element 72. The movement coupling element 70 is moved, together with the cut-depth setting element 54, relative to the guide path element 72. The movement of the movement coupling element 70 is transmitted to the indicating element 16 and the further indicating element 18 by means of the connection of the movement coupling element 70, guide element 36 and further guide element 38. Owing to the guiding of the guide element 36 and further guide element 38 on the constraint guide element 76, the indicating element 16 and the further indicating element 18 are moved jointly in dependence on a movement of the cut-depth setting element 54. A distance between the cut-edge indicating line formed by the indicating element 16 and the further cut-edge indicating line formed by the further indicating element 18 corresponds to a length of a cut of the machining tool 20, should the machining tool 20 be pivoted about a plunge pivot axis 64 until the housing unit 52 stops against a stop that can be set by means of the cut-depth setting element 54. The cut-length indicating device 10 comprises at least the movement coupling element 70 of the position setting unit 22, which is provided to move at least the indicating element 16 and the further indicating element 18 in dependence on a movement of the cut-depth setting element 54 of the cut-depth setting unit 50.

Furthermore, the cut-length indicating device 10 has at least one guide-rail difference compensating unit 78, which is provided to take account of thickness of the power-tool guide device in indication of the cut-edge indicating lines. The guide-rail difference compensating unit 78 may be realized electronically and/or mechanically. It is thus ensured that the cut-edge indicating lines formed by the indicating element 16 and the further indicating element 18 are aligned exactly to an emergence or entry cut edge of the machining tool 20, irrespective of whether or not the power-tool guide device is used together with the portable power tool 12. It is also conceivable, however, for the cut-length indicating device 10 to be realized so as to be separate from the guide-rail difference compensating unit 78, and designed already having a power-tool guide device in the case of the cut-length indicating device 10 being factory-fitted for use of the cut-length indicating device 10, or of the portable power tool 12 and the cut-length indicating device 10. In this case, upon a movement of the indicating element 16 and of the further indicating element 18 in dependence on the cut-depth setting element 54, a thickness of the power-tool guide device would already be taken into account in a design of the constraint guide element 76 and/or of the guide element 36 and of the further guide element 38.

Figure 3:
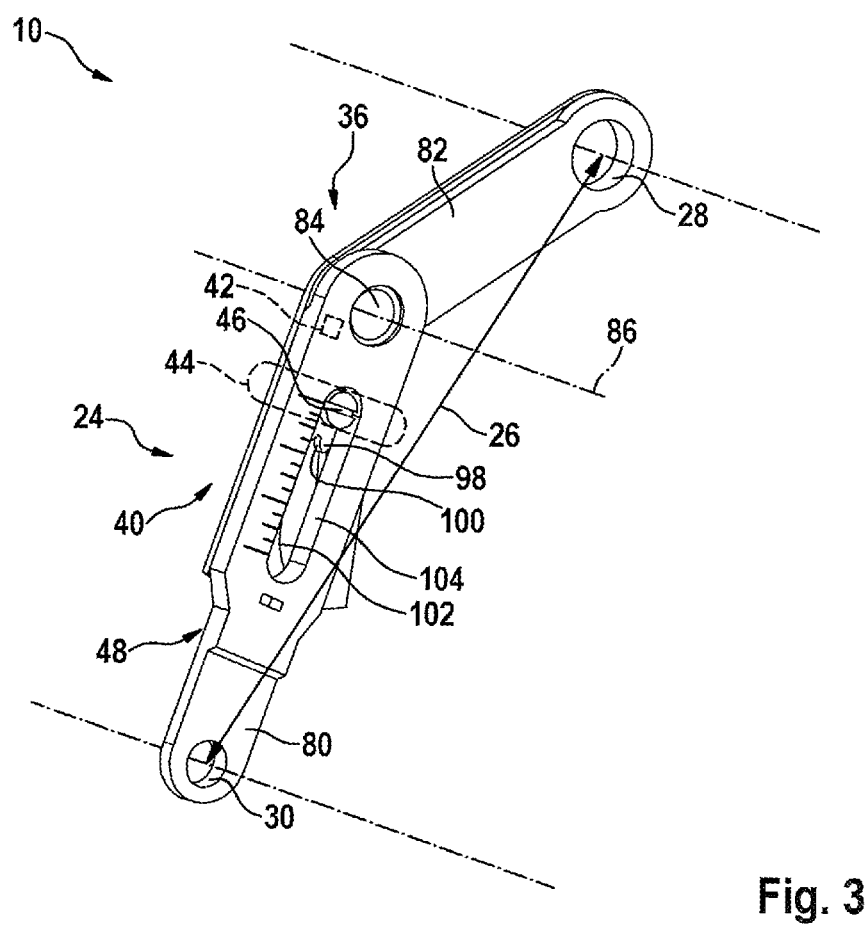
Figure 4:
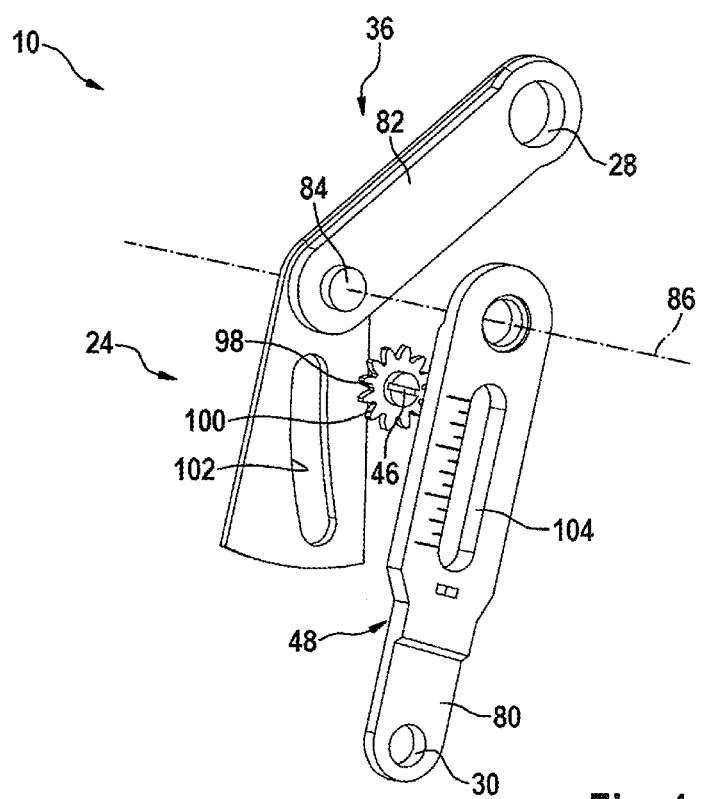
Figure 5:
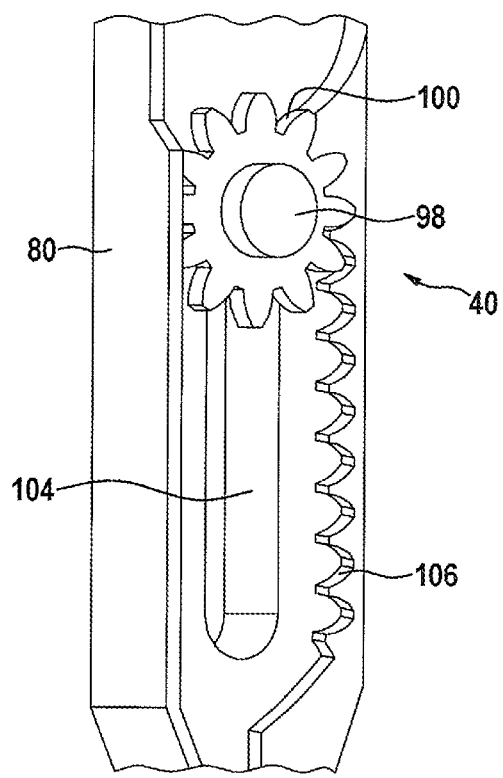
Figure 6:
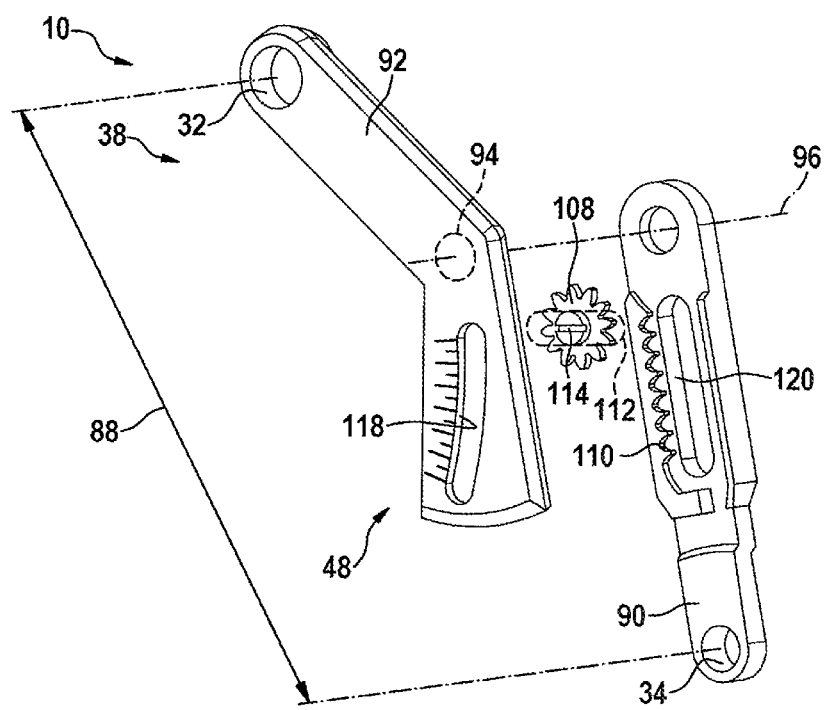

Furthermore, the cut-length indicating device 10 has at least one adjusting unit 24, which is provided, at least, to adapt at least one maximum setting movement distance of the indicating element 16 to at least one machining-tool parameter of the machining tool 20. The adjusting unit 24 is provided to adapt the at least one maximum setting movement distance of the indicating element 16 to at least one machining-tool diameter of the machining tool 20. For the purpose of adjusting the at least one maximum setting movement distance of the indicating element 16, the adjusting unit 24 is provided, at least, to set at least one maximum distance 26 between two connection regions 28, 30 at least of the guide element 36 of the position setting unit 22 on which the indicating element 16 is movably mounted (FIGS. 3 and 4). In this case, it is conceivable that setting of the maximum distance 26 between the two connection regions 28, 30 of the guide element 36 can be effected as a result of a translation, as a result of a rotation, as a result of a combination of a translation and a rotation, as a result of an elastic deformation, or the like, at least of sub-regions of the guide element 36. In the case of the adjusting unit 24 represented in FIGS. 3 to 6, setting of the maximum distance 26 between the two connection regions 28, 30 of the guide element 36 is effected as a result of a rotation of the connection regions 28, 30 of the guide element 36 relative to each other. One of the connection regions 28, 30 is disposed on a guide-element lower part 80 of the guide element 36, and one of the connection regions 28, 30 is disposed on a guide-element upper part 82 of the guide element 36. The guide-element lower part 80 and the guide-element upper part 82 are rotatably mounted on one another to form the guide element 36. The guide-element lower part 80 and the guide-element upper part 82 are rotatably mounted on one another by means of a joint portion 84 of the guide element 36. The joint portion 84 forms a central rotation axis 86 of the guide-element lower part 80 and guide-element upper part 82. It is also conceivable, however, for the guide element 36 to be made of an elastically deformable material such as, for example, spring steel or the like, and for the connection regions 28, 30 to be disposed at ends of the guide element 36 that face away from each other.

Further, the guide element 36 is rotatably mounted on the bearing pin element 74 by means of one of the connection regions 28, 30. The indicating element 16 is movably mounted on the guide element 36 by means of one of the connection regions 28, 30, in particular by means of the connection region 30, which faces away from the connection region 28, by means of which the guide element 36 is rotatably mounted on the bearing pin element 74. The connection regions 28, 30 are realized as bearing recesses. It is also conceivable, however, for the connection regions 28, 30 to be of a different design, considered appropriate by persons skilled in the art, such as, for example, designed as bearing pins or the like.

For the purpose of adapting the maximum setting movement distance of the indicating element 16 to a machining-tool diameter of the machining tool 20 by means of the adjusting unit 24, an adjusting element 98 of the adjusting unit 24 is movably mounted on the guide-element lower part 80 and the guide-element upper part 82 of the guide element 36. The adjusting element 98 is rotatably guided in a guide recess 102 of the guide-element upper part 82. In addition, the adjusting element 98 is rotatably mounted in a toothing recess 104 of the guide-element lower part 80. The adjusting element 98 is realized as a toothed wheel element. The adjusting element 98 comprises at least one toothing 100. The toothing 100 of the adjusting element 98 is provided to engage in a counter-toothing 106 of the guide-element lower part 80 that is disposed on an edge region of the toothing recess 104 of the guide-element lower part 80, on one side. The toothing recess 104 is of a straight linear shape. The guide recess 102 is of a curved shape. It is also conceivable, however, for the toothing recess 104 to be of a curved shape and the guide recess 102 to be of a straight linear shape. A rotation of the adjusting element 98 causes the toothing 100 of the adjusting element 98 to mesh with the counter-toothing 106 of the guide-element lower part 80. As a result, the adjusting element 98 moves within the guide recess 102. The guide-element lower part 80 and the guide-element upper part 82 can be swiveled relative to each other. This preferably results in the connection regions 28, 30 of the guide element 36 being moved toward each other or away from each other, in particular in dependence on a direction of rotation of the adjusting element 98. The maximum distance 26 between the connection regions 28, 30 can be set according to a radius of the machining tool 20. To enable an exact cut length to be indicated with precision in dependence on a set cut depth, the maximum distance 26 between the connection regions 28, 30, in particular in relation to the respective movement bearing axis of the corresponding connection region 28, 30, is to be set to a radius of the machining tool 20.

In addition, the adjusting unit 24 is provided to adapt at least one maximum setting movement distance of the further indicating element 18 to at least one machining-tool parameter of the machining tool 20. The adjusting unit 24 is provided to adapt the at least one maximum setting movement distance of the further indicating element 18 to at least one machining-tool diameter of the machining tool 20. For the purpose of adapting the at least one maximum setting movement distance of the further indicating element 18, the adjusting unit 24 is provided, at least, to set at least one maximum distance 88 between two connection regions 32, 34 at least of the further guide element 38 of the position setting unit 22 on which the further indicating element 18 is movably mounted. In this case, it is conceivable that setting of the maximum distance 88 between the two connection regions 32, 34 of the further guide element 38 can be effected as a result of a translation, as a result of a rotation, as a result of a combination of a translation and a rotation, as a result of an elastic deformation, or the like, at least of sub-regions of the further guide element 38. In the case of the adjusting unit 24 represented in FIGS. 3 to 6, setting of the maximum distance 88 between the two connection regions 32, 34 of the further guide element 38 is effected as a result of a rotation of the connection regions 32, 34 of the further guide element 38 relative to each other. One of the connection regions 32, 34 is disposed on a guide-element lower part 90 of the further guide element 38, and one of the connection regions 32, 34 is disposed on a guide-element upper part 92 of the further guide element 38. The guide-element lower part 90 and the guide-element upper part 92 are rotatably mounted on one another to form the further guide element 38. The guide-element lower part 90 and the guide-element upper part 92 are rotatably mounted on one another by means of a joint portion 94 of the further guide element 38. The joint portion 94 forms a central rotation axis 96 of the guide-element lower part 90 and guide-element upper part 92. It is also conceivable, however, for the further guide element 38 to be made of an elastically deformable material such as, for example, spring steel or the like, and for the connection regions 32, 34 to be disposed at ends of the further guide element 38 that face away from each other. Further designs of the guide element 36 and/or of the further guide element 38 that are considered appropriate by persons skilled in the art are likewise conceivable. In respect of functioning of the further guide element 38 for the purpose of adapting a maximum setting movement distance of the further indicating element 18 by means of the adjusting unit 24, in particular adjusting a maximum distance 88 between the connection regions 32, 34 of the further guide element 38, reference may be made to the description relating to adaptation of a maximum setting movement distance of the indicating element 16 by means of the adjusting unit 24. The adjusting unit 24 thus comprises at least one further adjusting element 108, which is at least substantially similar in design to the adjusting element 98 already described above, and which, in respect of functioning and disposition, is designed and disposed in an at least substantially similar manner (cf. FIGS. 4 and 6). The further guide element 38 thus likewise comprises at least one guide recess 118 and at least one toothing recess 120, on the edge region of which a counter-toothing 110 is disposed, on one side. It is conceivable, alternatively or additionally, for the adjusting unit 24 to comprise a central adjusting element, which is provided for moving the connection regions 28, 30, 32, 34 jointly. Moreover, it is conceivable for the movement of the connection regions 28, 30, 32, 34 to be effected by means of a drive unit such as, for example, by means of an electric motor, a piezoelectric element, a smart-material element, or the like.

The adjusting unit 24 comprises at least one self-inhibiting unit 40, which is provided to prevent, at least insofar as possible, an inadvertent adjustment of the at least one maximum setting movement distance of the indicating element 16 and/or of the further indicating element 18. The self-inhibiting unit 40 comprises at least the adjusting element 98, the further adjusting element 108 and the corresponding counter-toothings 106, 110. The toothing 100 of the adjusting element 98, a toothing of the further adjusting element 108 and the corresponding counter-toothings 106, 110 are realized in such a manner that self-inhibition is effected in a manner already known to persons skilled in the art, such as, for example, by a special design of tooth flanks, at least one additional clamping element that is provided to hold the respective adjusting element in a position, or the like. It is also conceivable, however, for a toothing to be additionally disposed on the guide-element lower part 80, which toothing effects self-inhibition as a result of the adjusting element 98, the toothing 100 of the adjusting element 98, the counter-toothing 106 and the additional toothing acting in combination.

Furthermore, the adjusting unit 24 comprises at least one resetting element 42, which is provided to enable the at least one adaptable maximum setting movement distance of the indicating element 16 and/or of the further indicating element 18 to be reset, at least partially automatically, to an initial adjustment state. The resetting element 42 is preferably realized as a spring element, in particular as a leg-spring element, which is provided to apply a spring force at least to the adjusting element 98 to enable the at least one adaptable maximum setting movement distance of the indicating element 16 and/or of the further indicating element 18 to be reset to an initial adjustment state, in particular after a holding force of the self-inhibiting unit 40 has been removed. It is conceivable in this case for the adjusting unit 24 to comprise at least two resetting elements 42, one of the resetting elements 42 being assigned, respectively, to one of the adjusting elements 98, 108. In the case of a motor-driven adjusting unit 24, it is also conceivable for the resetting element 42 to be constituted by an actuator or the like.

The adjusting unit 24 additionally has at least one operating element 44 (represented only by a broken line in FIG. 3) for adapting the at least one maximum setting movement distance of the indicating element 16 and/or of the further indicating element 18 to at least one machining-tool parameter of the machining tool 20. Preferably, the operating element 44 is realized as an operating knob, which is disposed on the adjusting element 98. The adjusting unit 24 comprises at least one further operating element 112 (represented only by a broken line in FIG. 6), which is disposed on the further adjusting element 98.

Moreover, the adjusting unit 24 has at least one adjusting-tool receiving interface 46 for adapting the at least one maximum setting movement distance of the indicating element 16 and/or of the further indicating element 18 to at least one machining-tool parameter of the machining tool 20, it being possible for an adjusting tool to be detachably disposed on the adjusting-tool receiving interface 46. The adjusting-tool receiving interface 46 is disposed on the adjusting element 98 or on the operating element 44. The adjusting unit 24 comprises at least one further adjusting-tool receiving interface 114, which is disposed on the further adjusting element 108 or on the further operating element 112.

The cut-length indicating device 10 is disposed on the housing unit 52, in particular on a side of the housing unit 52 that faces toward the protective unit 60. The cut-length indicating device 10 is disposed at least partially in the protective unit 60. The protective unit 60 has at least one operating opening 116 for operation of the adjusting unit 24, on a side that faces away from the housing unit 52. The adjusting unit 24 of the cut-length indicating device 10 is disposed on the housing unit 52 such that it can be operated from the outside.

Furthermore, the cut-length indicating device 10 comprises at least one output unit 48, which is provided to output at least one adjustment parameter of the adjusting unit 24. The output unit 48 comprises at least one scale, which is disposed on the guide element 36. The output unit 48 additionally comprises a further scale, which is disposed on the further guide element 38. The output unit 48 is provided to indicate a machining diameter of the machining tool 20, in dependence on which the maximum setting movement distances of the indicating element 16 and of the further indicating element 18 can be adapted.

What is claimed is:

1. A cut-length indicating device for a portable power tool, a cut-length defined between opposite cut edges of a machining tool when the machining tool is at a set cut depth within a workpiece, comprising:
   at least one indicating unit including at least one movably mounted indicating element configured to indicate at least one position of a cut edge of the machining tool in dependence on the set cut depth of the machining tool;
   at least one position setting unit configured to move the indicating element into a position that is dependent on a cut-depth setting of the machining tool; and
   at least one adjusting unit configured to adapt at least one maximum setting movement distance of the indicating element to at least one machining-tool parameter of the machining tool, wherein the adjusting unit, for the purpose of adapting the at least one maximum setting movement distance of the indicating element, is configured to set at least one maximum distance between two connection regions of at least one guide element of the position setting unit on which the indicating element is movably mounted.

2. The cut-length indicating device according to claim 1, wherein the adjusting unit is further configured to adapt the at least one maximum setting movement distance of the indicating element to at least one machining-tool diameter of the machining tool.

3. The cut-length indicating device according to claim 1, wherein:
   the at least one maximum setting movement distance has an initial adjustment state; and
   the adjusting unit includes at least one resetting element configured to enable at least partial automatic resetting of the at least one maximum setting movement distance of the indicating element to return to said initial adjustment state.

4. The cut-length indicating device according to claim 1, wherein the adjusting unit includes at least one operating element configured to adapt the at least one maximum setting movement distance of the indicating element to at least one machining-tool parameter of the machining tool.

5. The cut-length indicating device according to claim 1, wherein:
the adjusting unit includes at least one adjusting-tool receiving interface configured to adapt the at least one maximum setting movement distance of the indicating element to the at least one machining-tool parameter of the machining tool, and
the adjusting-tool receiving interface is configured for detachable engagement to an adjusting tool.

6. The cut-length indicating device according to claim 1, further comprising:
at least one output unit configured to output at least one adjustment parameter of the adjusting unit.

7. A cut-length indicating device for a portable power tool, a cut-length defined between opposite cut edges of a machining tool when the machining tool is at a set cut depth within a workpiece, comprising:
at least one indicating unit including at least one movably mounted indicating element configured to indicate at least one position of a cut edge of the machining tool in dependence on the set cut depth of the machining tool;
at least one position setting unit configured to move the indicating element into a position that is dependent on a cut-depth setting of the machining tool; and
at least one adjusting unit configured to adapt at least one maximum setting movement distance of the indicating element to at least one machining-tool parameter of the machining tool, wherein the adjusting unit includes at least one self-inhibiting unit configured to prevent an inadvertent adjustment of the at least one maximum setting movement distance of the indicating element.

8. The cut-length indicating device according to claim 7, wherein the adjusting unit is further configured to adapt the at least one maximum setting movement distance of the indicating element to at least one machining-tool diameter of the machining tool.

9. The cut-length indicating device according to claim 7, wherein the adjusting unit, for the purpose of adapting the at least one maximum setting movement distance of the indicating element, is configured to set at least one maximum distance between two connection regions of at least one guide element of the position setting unit on which the indicating element is movably mounted.

10. The cut-length indicating device according to claim 7, wherein:
the at least one maximum setting movement distance has an initial adjustment state; and
the adjusting unit includes at least one resetting element configured to enable at least partial automatic resetting of the at least one maximum setting movement distance of the indicating element to return to said initial adjustment state.

11. The cut-length indicating device according to claim 7, wherein the adjusting unit includes at least one operating element configured to adapt the at least one maximum setting movement distance of the indicating element to at least one machining-tool parameter of the machining tool.

12. The cut-length indicating device according to claim 7, wherein:
the adjusting unit includes at least one adjusting-tool receiving interface configured to adapt the at least one maximum setting movement distance of the indicating element to the at least one machining-tool parameter of the machining tool, and
the adjusting-tool receiving interface is configured for detachable engagement to an adjusting tool.

13. The cut-length indicating device according to claim 7, further comprising:
at least one output unit configured to output at least one adjustment parameter of the adjusting unit.

14. A portable power tool, comprising:
at least one cut-depth setting unit configured to set a maximum cut depth of a machining tool, wherein when the machining tool is at the maximum cut depth within a workpiece the machining tool defines opposite cut edges corresponding to the cut length in the workpiece; and
at least one cut-length indicating device including (i) at least one indicating unit including at least one movably mounted indicating element configured to indicate at least one position of a cut edge of the machining tool in dependence on the set cut depth of the machining tool, (ii) at least one position setting unit configured to move the indicating element into a position that is dependent on the cut-depth setting of the machining tool, and (iii) at least one adjusting unit configured to adapt at least one maximum setting movement distance of the indicating element to at least one machining-tool parameter of the machining tool,
wherein the adjusting unit, for the purpose of adapting the at least one maximum setting movement distance of the indicating element, is configured to set at least one maximum distance between two connection regions of at least one guide element of the position setting unit on which the indicating element is movably mounted.

15. The portable power tool according to claim 14, further comprising:
at least one housing unit on which the at least one adjusting unit of the cut-length indicating device is disposed such that the at least one adjusting unit can be operated from outside the at least one housing unit.

* * * * *

UNITED STATES PATENT AND TRADEMARK OFFICE
CERTIFICATE OF CORRECTION

| | |
|---|---|
| PATENT NO. | : 10,005,199 B2 |
| APPLICATION NO. | : 14/954771 |
| DATED | : June 26, 2018 |
| INVENTOR(S) | : Sinzig et al. |

It is certified that error appears in the above-identified patent and that said Letters Patent is hereby corrected as shown below:

In the Claims

Column 18, Lines 20-25, Lines 2-7 of Claim 14 should be corrected as follows:
at least one cut-depth setting unit configured to set a
    maximum cut depth of a machining tool, wherein when
    the machining tool is at the maximum cut depth within
    a workpiece, the machining tool defines opposite cut
    edges corresponding to the cut length in the workpiece;
    and Signed and Sealed this
Eleventh Day of December, 2018

Andrei Iancu
*Director of the United States Patent and Trademark Office*